US012778082B1

(12) United States Patent
Martin

(10) Patent No.: US 12,778,082 B1
(45) Date of Patent: Nov. 3, 2026

(54) MULTI PURPOSE KIT FOR PET TUG TOY AND LEASH

(71) Applicant: Sean Michael Martin, Chicago, IL (US)

(72) Inventor: Sean Michael Martin, Chicago, IL (US)

(*) Notice: Subject to any disclaimer, the term of this patent is extended or adjusted under 35 U.S.C. 154(b) by 0 days.

(21) Appl. No.: 18/609,138

(22) Filed: Mar. 19, 2024

(51) Int. Cl.
*A01K 27/00* (2006.01)
*A01K 15/02* (2006.01)

(52) U.S. Cl.
CPC .......... *A01K 27/003* (2013.01); *A01K 15/026* (2013.01)

(58) Field of Classification Search
CPC .................................................... A01K 27/003
See application file for complete search history.

(56) References Cited

U.S. PATENT DOCUMENTS 4,252,084 A * 2/1981 Willow ................ A01K 27/003 119/771
4,879,972 A * 11/1989 Crowe ................ A01K 27/003 119/792
4,892,063 A * 1/1990 Garrigan .............. A01K 27/003 119/795
4,947,801 A * 8/1990 Glass .................. A01K 1/0272 119/784
5,415,132 A * 5/1995 Meyer .................. A01K 27/003 119/707
5,649,504 A * 7/1997 Culp .................... A01K 27/003 119/795
5,732,662 A * 3/1998 Jacobsen .............. A01K 27/003 119/798
6,371,055 B1 * 4/2002 Lawrence ............ A01K 27/003 119/858
6,439,168 B1 * 8/2002 Maglich ............... A01K 27/003 119/795
6,619,238 B1 * 9/2003 Amato ................. A01K 27/005 119/797
6,675,742 B1 * 1/2004 Shiraki ................ A01K 27/003 119/793
6,827,045 B1 * 12/2004 Willner ................ A01K 27/003 119/795
7,757,639 B1 * 7/2010 Prendes ............... A01K 27/003 119/772
10,420,326 B1 * 9/2019 Rand .................... A01K 27/005
10,602,720 B1 * 3/2020 Schwartz ............. A01K 27/003
2007/0215063 A1 * 9/2007 Simpson .............. A01K 15/026 119/708

(Continued)

FOREIGN PATENT DOCUMENTS

CA 2976566 A1 * 2/2019
DE 9107828 U1 * 11/1991

(Continued)

*Primary Examiner* — Jessica B Wong
(74) *Attorney, Agent, or Firm* — Michael D. Eisenberg

(57) ABSTRACT

An aspect of some embodiments of the present invention relates to a pet accessory kit, comprising at least one handle, at least one double-clasped rope, at least one single-clasped rope, and at least one a chew toy. At least some of the at least one handle, the at least one double-clasped rope the, single-clasped rope, and the chew toy, are detachably joinable to each other to form a pet leash or a pet tug-of-war assembly. The pet accessory kit may also include a stretchable element and a safety lanyard.

20 Claims, 15 Drawing Sheets

100

(56) References Cited

U.S. PATENT DOCUMENTS

| | | | | |
|---|---|---|---|---|
| 2007/0272167 | A1* | 11/2007 | Bird | A01K 27/005 119/801 |
| 2010/0199926 | A1* | 8/2010 | McCullough | A01K 27/003 119/769 |
| 2012/0012071 | A1* | 1/2012 | Hinojosa | A01K 27/003 24/265 R |
| 2012/0090556 | A1* | 4/2012 | Rosa | A01K 15/026 119/709 |
| 2012/0186538 | A1* | 7/2012 | Newton | A01K 27/003 119/795 |
| 2013/0092101 | A1* | 4/2013 | Sylvanowicz | A01K 27/003 119/795 |
| 2013/0160718 | A1* | 6/2013 | Weaver-Pelaez | A01K 27/003 119/795 |
| 2015/0090193 | A1* | 4/2015 | Giarrizzo | A61D 5/00 119/709 |
| 2016/0262353 | A1* | 9/2016 | Arnold | A01K 27/005 |
| 2017/0079244 | A1* | 3/2017 | Mullin | A01K 15/026 |
| 2018/0070561 | A1* | 3/2018 | Sebö | A01K 15/026 |
| 2018/0199547 | A1* | 7/2018 | Moore | A01K 27/003 |
| 2018/0368356 | A1* | 12/2018 | Case | A01K 27/003 |
| 2019/0116762 | A1* | 4/2019 | Litzsinger | A01K 27/005 |
| 2019/0124891 | A1* | 5/2019 | Swinton | A45C 11/24 |
| 2020/0037581 | A1* | 2/2020 | Case | A01K 27/003 |
| 2020/0085017 | A1* | 3/2020 | Gregson | A01K 27/003 |
| 2020/0100470 | A1* | 4/2020 | Cibotti | A01K 27/001 |
| 2020/0296933 | A1* | 9/2020 | Andaloro | A01K 27/006 |
| 2021/0037789 | A1* | 2/2021 | Owens | A01K 27/003 |
| 2021/0127639 | A1* | 5/2021 | Calandro | A01K 27/005 |
| 2021/0274753 | A1* | 9/2021 | Altman | A01K 27/005 |
| 2021/0360902 | A1* | 11/2021 | Druxman | A01K 27/003 |
| 2022/0312737 | A1* | 10/2022 | Bekhit | A01K 15/026 |
| 2024/0099270 | A1* | 3/2024 | Behravesh | A01K 27/003 |
| 2024/0224942 | A1* | 7/2024 | Pluta | A01K 27/003 |
| 2024/0268350 | A1* | 8/2024 | Zhu | A01K 27/003 |
| 2024/0381846 | A1* | 11/2024 | Sporn | A01K 27/005 |
| 2025/0048998 | A1* | 2/2025 | Boggan, II | A01K 27/003 |

FOREIGN PATENT DOCUMENTS

| | | | | |
|---|---|---|---|---|
| DE | 102017128188 | B3 * | 2/2019 | |
| GB | 2531535 | A * | 4/2016 | A01K 27/003 |
| JP | 3618148 | B2 * | 2/2005 | A01K 27/003 |

* cited by examiner

MULTI PURPOSE KIT FOR PET TUG TOY AND LEASH

TECHNICAL FIELD

This invention relates to accessories or pets, and more particularly, to pet leashes and tug toys.

BACKGROUND OF THE INVENTION

In many countries, pets, especially (but not only) dogs, are required to be leashed in public spaces. In addition, many pets require daily exercise. For example, dogs like to play tug-of-war, by biting on a toy and having the dog's owner pull on that toy.

Most pet accessories in today's market are designed for the enjoyment of the pet, but rarely take into account the needs and enjoyment of the pet's owner.

BRIEF SUMMARY OF EMBODIMENTS OF THE INVENTION

An aim of the present invention is the provision of a kit having parts that can be removably joined to each other to generate different types of leashes and tug toys, according to the user's need.

Another aim of the present invention is the provision of a kit that accommodates the needs of the pet's owner and not only of the pet. Thus the leashes and tug toys generated by the kit of the present invention are meant for the enjoyment of the pet and the pet's owner alike. This may improve the experience of the pet and the pet's owner, and may improve the connection between pet and pet owner.

An aspect of some embodiments of the present invention relates to a pet accessory kit, comprising at least one handle, at least one double-clasped rope, at least one single-clasped rope, and at least one a chew toy. The handle has a hand grip and a looping cord. The at least one double-clasped rope has two first ends, each first end having a respective first end attachment and a respective first clasp, each first clasp being rotatably joined to the respective first end attachment, such that each first clasp of the double-clasped rope is configured to swivel at 360 degrees with respect to the first respective end attachment. The at least one single-clasped rope has two second ends, one of the second ends being a free end configured to be knotted and another of the two second ends having a second end attachment and a second clasp, such that the second clasp is configured to swivel at 360 degrees with respect to the second end attachment. The at least one a chew toy has a perforation sized to be traversed by the at least one double-clasped rope, the first end attachment, the first clasp, the at least one single-clasped rope, the second end attachment and the second clasp. At least some of the at least one handle, the at least one double-clasped rope the, single-clasped rope, and the chew toy, are detachably joinable to each other to form a pet leash or a pet tug-of-war assembly.

In a variant, the at least one double-clasped rope comprises two or more double-clasped ropes, each having respective first ends having respective first end attachments and respective first clasps.

At least some of the two or more double-clasped ropes may have different lengths.

In another variant, the at least one double-clasped rope is a plastic rope.

In yet another variant, the at least one handle comprises a swivel end and the looping cord is joined to the swivel end, such that the looping cord is configured to swivel at 360 degrees with respect to the swivel end.

In a further variant, the hand grip comprises an ergonomic sheath partially sheathing the looping cord.

In yet a further variant, the first end attachments and the second end attachment are covered by a cover.

In a variant, the free end of the single-clasped rope is configured to be knotted with knot sized to not traverse the perforation of the chew toy, and is configured to be tied so that a loop is formed near the knot.

In another variant, the pet accessory kit further comprises a stretchable element, which comprises: an elastic rope; a ring or third clasp on one end of the elastic rope; a fourth clasp on another end of the elastic rope; and a compliant, non-stretchable strap which has both ends connected to the ends of the elastic rope. The elastic rope in an equilibrium length thereof is shorter than the strap.

In yet another variant, the pet accessory of claim 1, further comprises a safety lanyard, comprising a cord having a third clasp at one end and a ring at the other end. The ring is large enough to be traversed by the third clasp and the cord.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
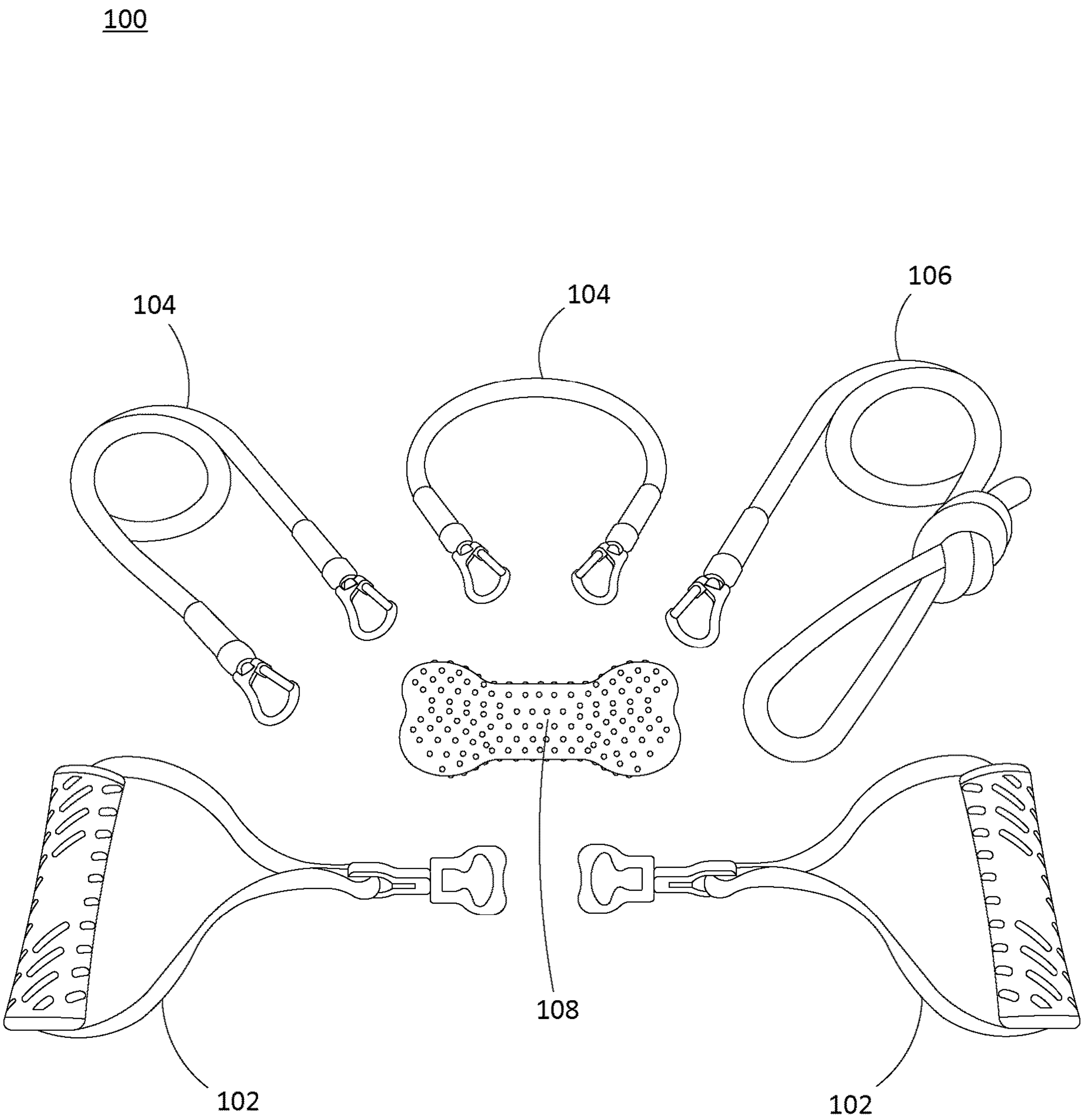
FIG. 1 shows elements of a pet accessory kit, according to some embodiments of the present invention.

Referring now to the drawings, FIG. 1 shows elements of a pet accessory kit, according to some embodiments of the present invention.

The kit 100 includes at least one handle 102, at least one double-clasped rope 104, at least one single-clasped rope 106, and at least chew toy 108. These elements can be detachably joined together in different combinations, to form a pet leash or a pet tug-of-war assembly. As will be explained below, different types of pet leashes or pet tug-of-war assemblies can be constructed using some or all of these elements combined together.

Figure 2:
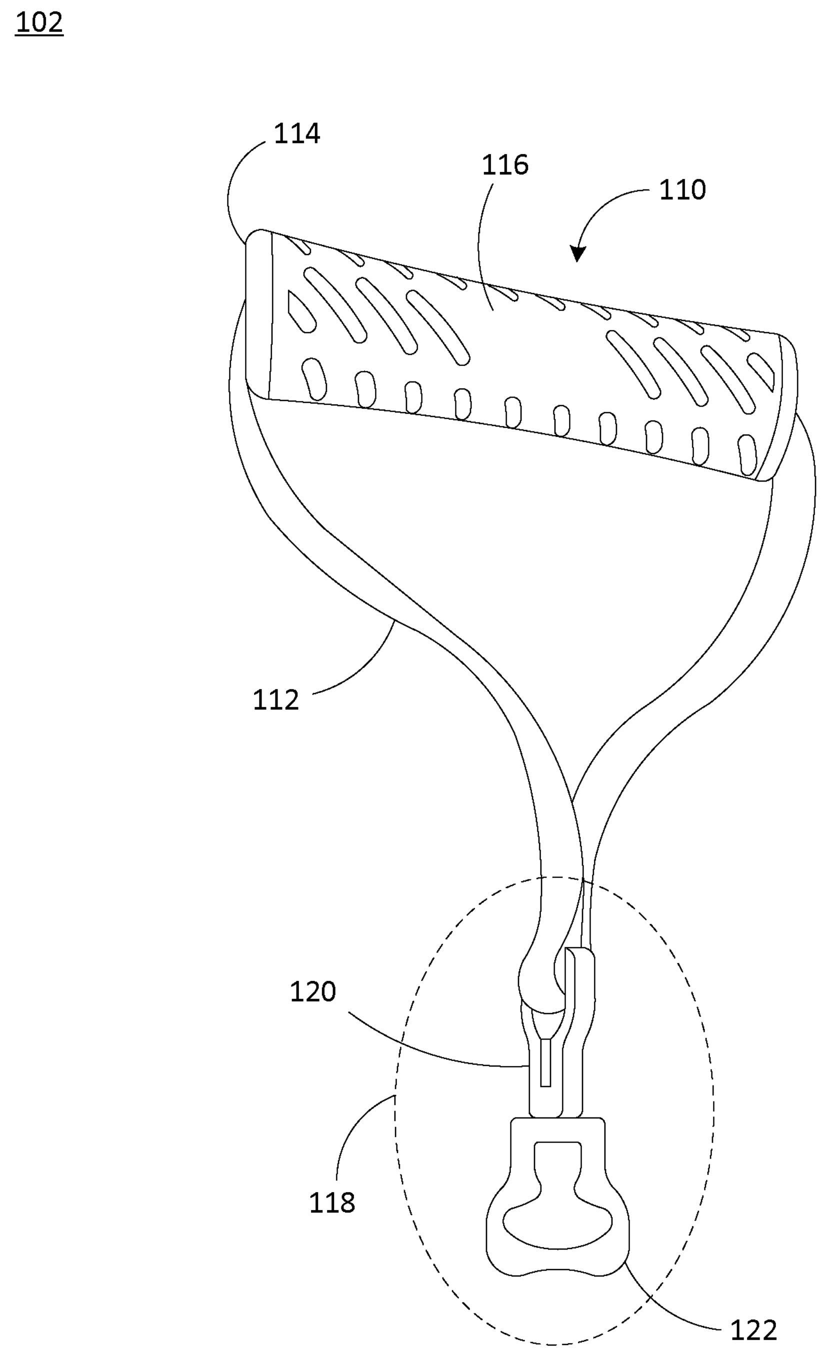
FIG. 2 shows a handle of the kit, according to some embodiments of the present invention.

FIG. 2 shows a handle 102 of the kit of FIG. 1, according to some embodiments of the present invention.

The handle 102 includes a hand grip 110 and a looping cord 112. the hand grip 110 may include an ergonomic sheath partially sheathing the looping cord 112. In some embodiments of the present invention, the looping cord 112 is compliant. The looping cord may be made of any compliant material, such as nylon, compliant plastic, textile materials, etc.

In some embodiments of the present invention the hand grip 110 includes a rigid or semi-rigid shaft 114 at least partially covered by a flexible layer 116, to enhance the comfort of the user. In a non-limiting example, the shaft 114 is made of plastic (such as Acrylonitrile Butadiene Styrene (ABS), for example), though other materials, such as metal or wood, for example, may be used instead or in combination. In a non-limiting example, the flexible layer is made of thermoplastic rubber, though other material, such as silicon or textiles, for example, may be used instead.

In some embodiments of the present invention, the handle 102 includes a swivel end 118. The swivel end 118 includes a clip 120 joined to the looping cord 112 and a connection loop 122 rotatably joined to the clip 120. The connection loop 122 is configured to swivel at 360 degrees with respect to the clip 120. The clip 120 and the connection loop 122 of the swivel end 118 may be made of aluminum, but may be made of any material, such as plastic, metal, alloys, etc. The connection loop 122 is configured to receiving clasps of the double-clasped rope(s) or the knotted rope(s), or of other clasped elements (such as the bungee handle that will be described further below), as will be explained below.

Figure 3A:
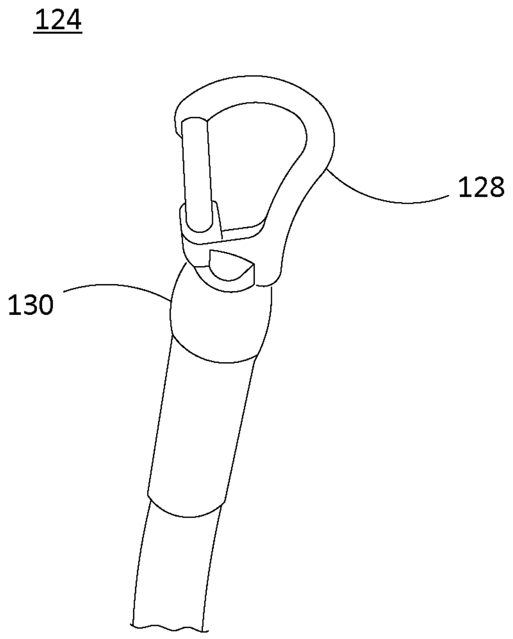
FIGS. 3*a* and 3*b* illustrate a clasped end of a double-clasped rope of the kit, according to some embodiments of the present invention.
Figure 3B:
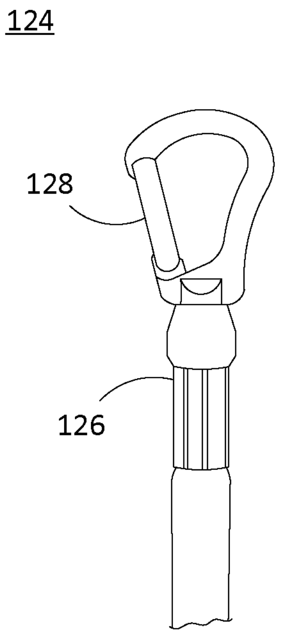

FIGS. 3*a* and 3*b* illustrate a clasped end 124 of a double-clasped rope of the kit of FIG. 1, according to some embodiments of the present invention. In FIG. 3*a*, a first end attachment 128 of the clasped end 124 is covered by a soft cover 130. In FIG. 3*b*, the first end attachment 128 is uncovered.

Each double-clasped rope 104 (of FIG. 1) has two first ends 124. Each first end has a respective first end attachment 126 and a respective first clasp 128. Each first clasp 128 is rotatably joined to the respective first end attachment 126, such that each first clasp 128 of the double-clasped rope 104 is configured to swivel at 360 degrees with respect to respective the first end attachment 126. The clasps 128 can be used to joined the double clasped rope, to a handle, to a pet's collar or pet's harness, or to other clasped or ringed elements (such as the bungee handle that will be described further below). In some embodiments of the present invention, the clasps 128 are made of aluminum, though any other material, such as a different metal, an alloy, or plastic may be used. The clasps 128 may be in the form of carabiner clips.

In some embodiments of the present invention, the first end attachments 126 are covered by a soft cover 130, such as silicon or sift rubber, for example. The cover 130 is configured to prevent contact of the pet with the rigid attachment, thereby protecting the pet from injury if the pet bites the ends of the double clasped rope.

The double-clasped rope 104 is flexible. The double-clasped rope 104 may be made of a textile material or plastic, for example. In a non-limiting example, the double-clasped rope 104 is made of recycled plastic.

In some embodiments of the present invention, the kit 100 of FIG. 1 includes a plurality of double-clasped ropes 104. The double-clasped ropes in the kit may have different lengths. For example, a short double-clasped rope may have a length between 35 and 45 cm, while a medium-length double-clasped rope may have a length between 75 and 85 cm. The short double-clasped rope may be used as a collar, by being looped around the pet's neck, so the clasps connect to each other.

Figure 4A:
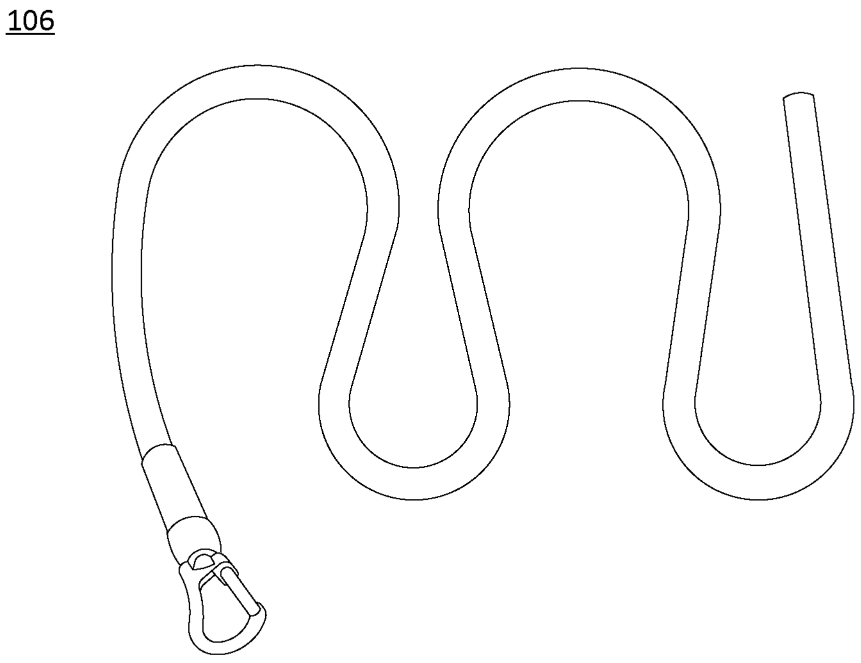
FIGS. 4*a* and 4*b* illustrate a single-clasped rope of the kit according to some embodiments of the present invention.
Figure 4B:
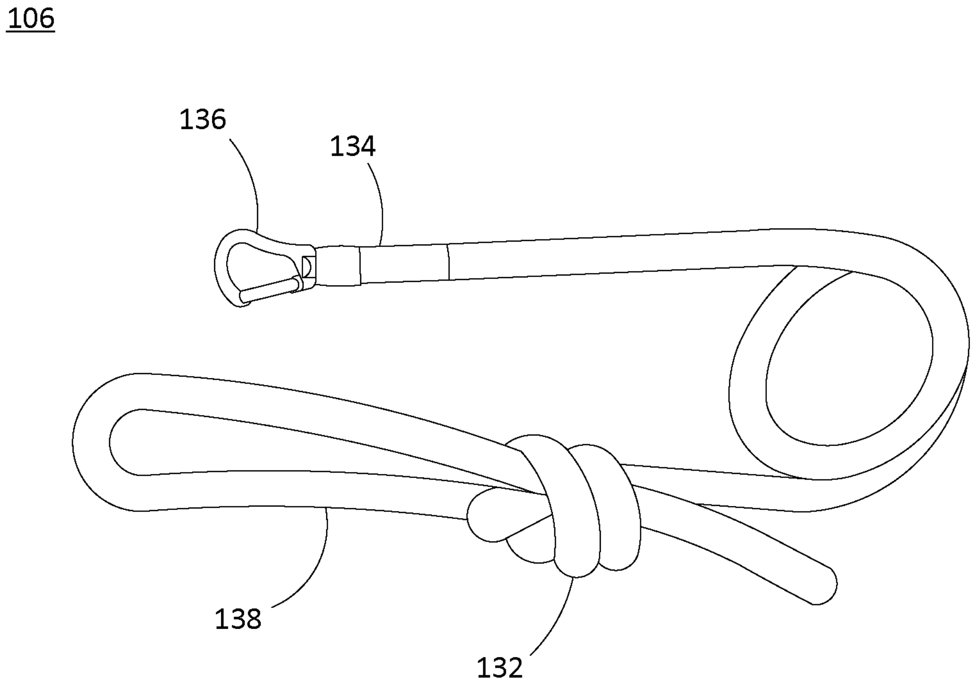

FIGS. 4*a* and 4*b* illustrate a single-clasped rope 106 of the kit 100 of FIG. 1, according to some embodiments of the present invention. In FIG. 4*a*, the single-clasped rope 106 is shown to have a free end. In FIG. 4*b*, the free end is tied to form a knot and a loop.

The single-clasped rope 106 has two ends. One of the second ends is free and can be tied to form a knot 132, while the other end has a second end attachment 134 and a second clasp 136. The second end attachment 134 and a second clasp 136 are similar to the first end attachment 126 and a first clasp 128 described above in reference to FIG. 3. The single-clasped rope is compliant, and may be made of any compliant material, similarly to the double-clasped rope, as described above.

In some embodiments of the present invention, the second end of the single-clasped rope 106 can be tied to form a loop 138 near the knot 132.

Figure 5:
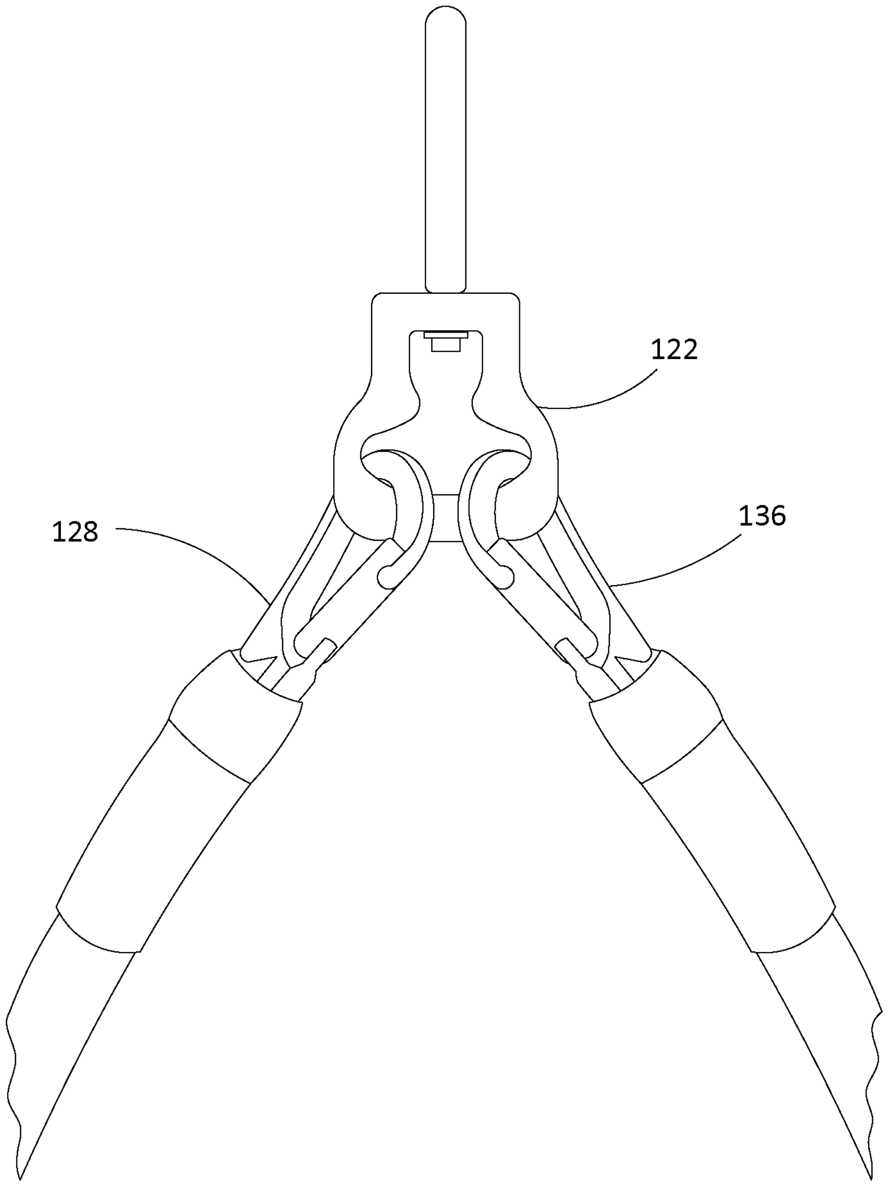
FIG. 5 illustrates a handle of the kit, joined to a plurality of clasps, according to some embodiments of the present invention.

FIG. 5 illustrates a handle of the kit, joined to a plurality of clasps (128, 136), according to some embodiments of the present invention. The clasps may belong to double-clasped ropes or to knotted ropes. The clasps are joined directly to the connection loop 122.

Figure 6:
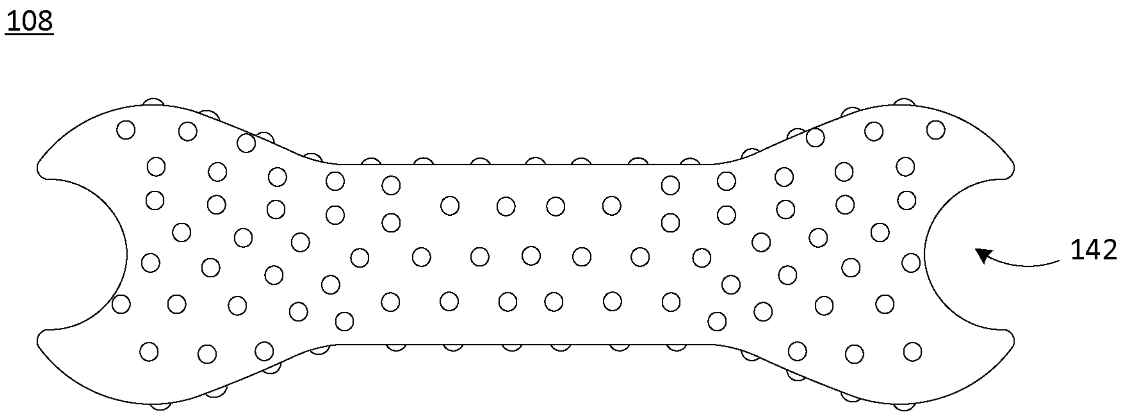
FIGS. 6-8 are different view of the chew toy, according to some embodiments of the present invention.
Figure 7:
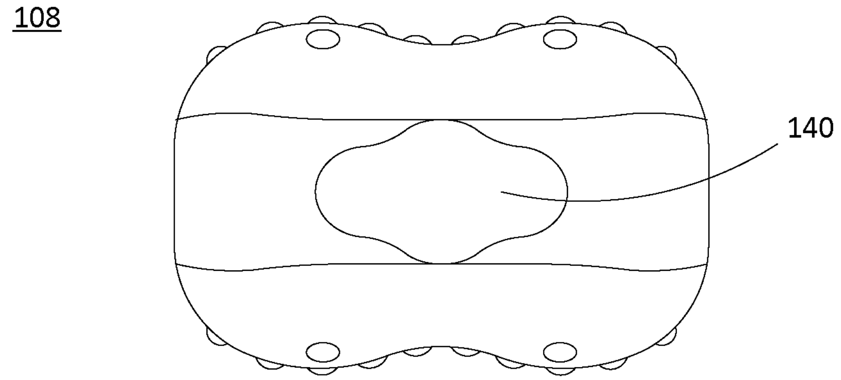
Figure 8:
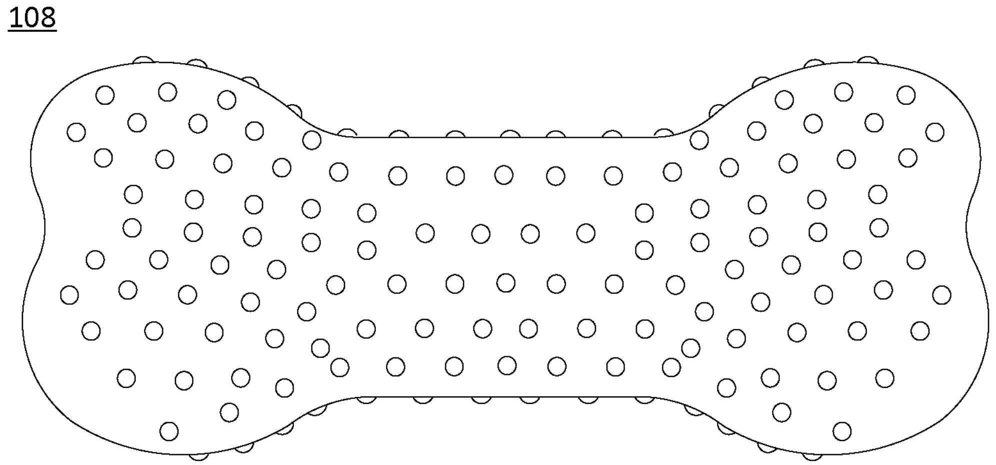

FIGS. 6-8 are different views of the chew toy 108, according to some embodiments of the present invention. FIG. 6 is a top view of the chew toy. FIG. 7 is a side view of the chew toy. FIG. 8 is a front view of the chew toy.

The chew toy 108 has a perforation 140 sized to be traversed by the double-clasped rope 104, the first end attachment 126, the first clasp 128, the single-clasped rope 106, the second end attachment 134, and the second clasp 136. The knot 132 of the single-clasped rope is larger than the perforation and therefore does not traverse the perforation. In this manner, the chew toy 108 can be joined to the single-clasped rope 106 by being slid onto the single-clasped rope via the second clasp 136 and the second end attachment 134. The knot 132 blocks the chew toy 108 and prevents the chew toy 108 from sliding off the single-clasped rope 106 from the knotted end of the chew toy.

In some embodiments of the present invention, an open groove 142 is cut out on each lateral side of the chew toy 108. The open grooves extend from top to bottom. The open grooves provide space of the cords traversing the perforation 104 to curve around the chew toy with decreased jutting from the sides of thew toy.

In some embodiments of the present invention, the chew toy 108 is elastic, and may be made from an elastic material such as rubber (natural or man-made).

The chew toy, joined to a rope can be used as a tug-of-war assembly to enable a user to play tug-of-war with the pet. In this game, the pet bites the chew toy 108, while the user handles the rope &/or handle to which the chew toy 108 is attached.

The chew toy 108 may also be used alone, detached from the rope. In this case, the perforation 140 of the chew toy 108 mat be filled with pet treats, and the pet may play with the chew toy 108 trying to reach the treats within.

Figure 17:
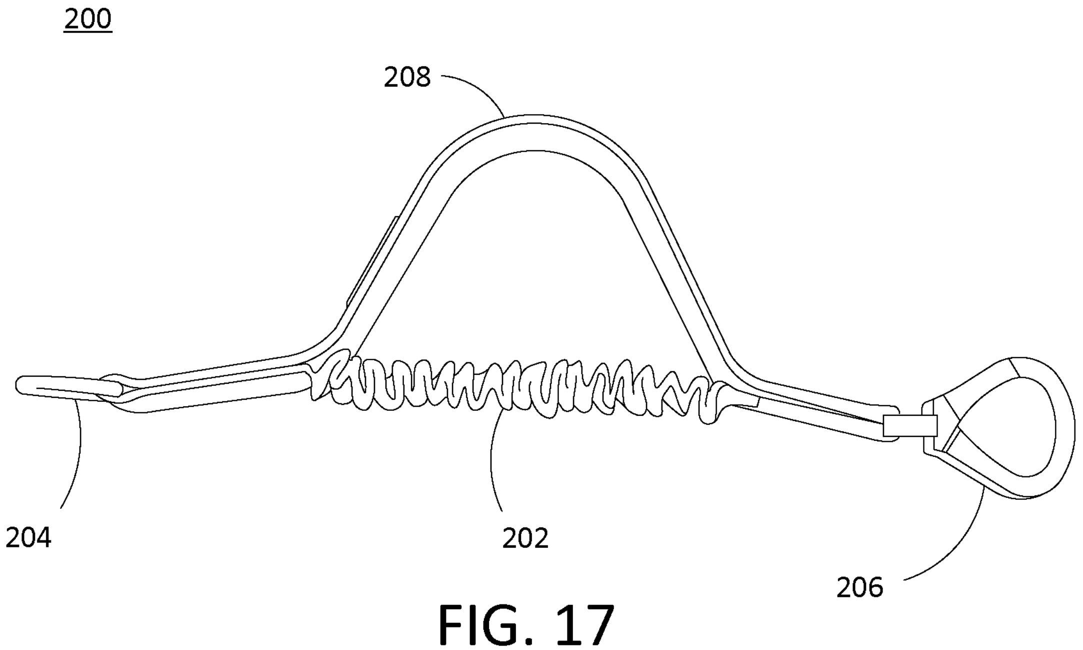
FIGS. 17-19 illustrate a stretchable element, according to some embodiments of the present invention.
Figure 18:
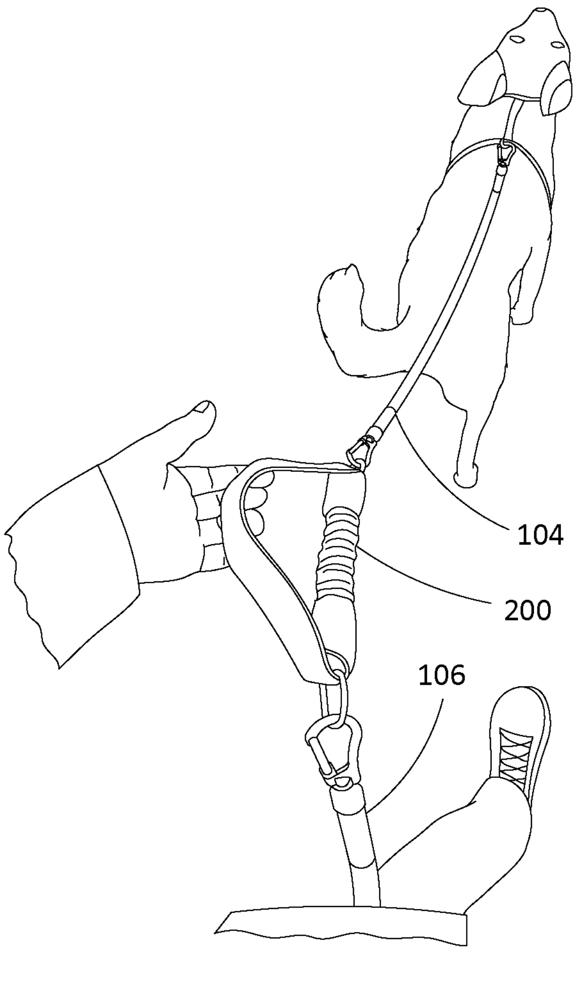
Figure 19:
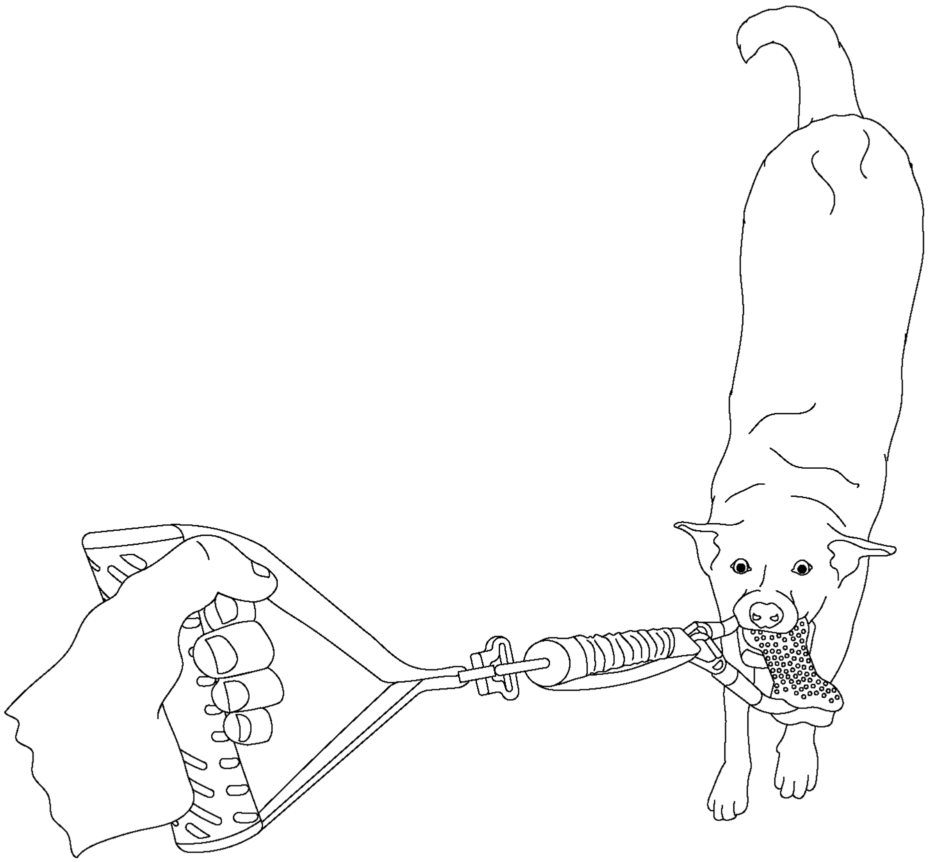
Figure 20:
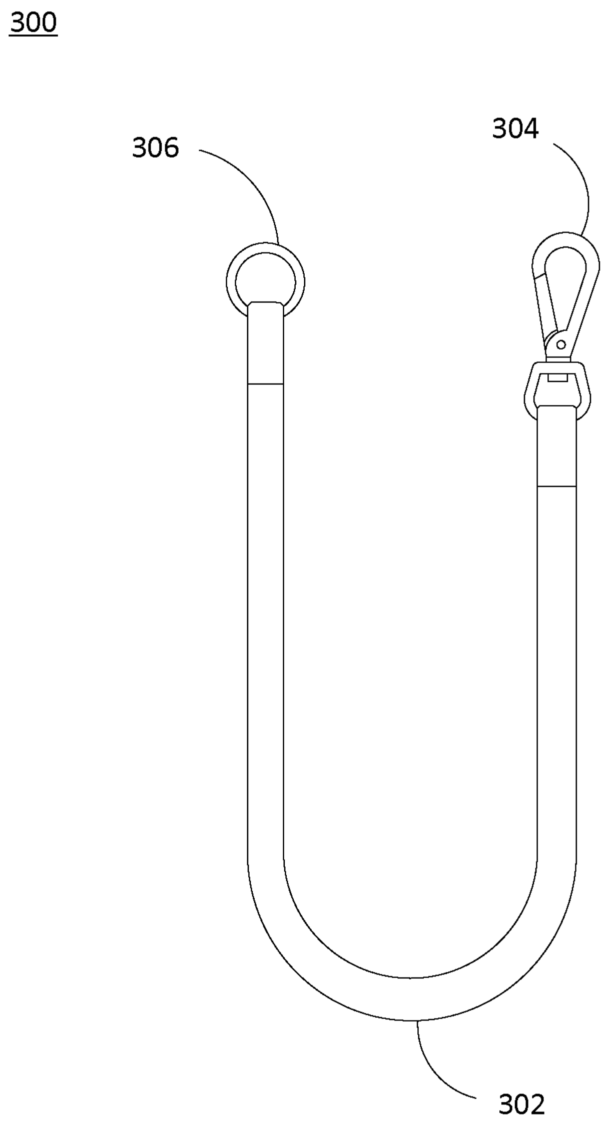
FIG. 20 illustrates a safety lanyard, according to some embodiments of the present invention.

FIGS. 17-19 illustrate a stretchable element 200, according to some embodiments of the present invention, also called "bungee handle".

The kit 100 may include the stretchable element bungee handle 200. The stretchable element includes an elastic rope 202 having a ring 204 on one end and a clasp 206 at the other end, and a strap 208 which has both ends connected to the ends of the elastic rope 202. The ring 204 can be connected to any of the clasps of the ropes described above, while the clasp 206 can be connected to the swivel end of a handle or to another rope's clasp. In some embodiments of the present invention, the ring 204 may be replaced by another clasp.

The strap is compliant but not stretchable and not elastic. In its equilibrium length, the elastic rope 202 is shorter than the strap 208. The elastic rope 202 may be stretched, but the stretching is limited by the length of the straps 208. For example, the elastic rope may be a 6-inch bungee rope, while the strap may be a 12-inch strap. The bungee rope may be extended to 12 inches, as the strap is not stretchable.

The stretchable element 200 may be placed between different elements of the kit, to provide some give or additional resistance between the elements, and/or to provide an extra handle.

As seen in the example of FIG. 17, the stretchable element 200 may be located between a single-clasped rope 106 and a double-clasped rope 104 which form a hands-free leash described in FIG. 9. This allows some extension of a hands-free leash and provides the user a handle (in the form the strap) that can be used to better control the pet when needed.

Figure 10A:
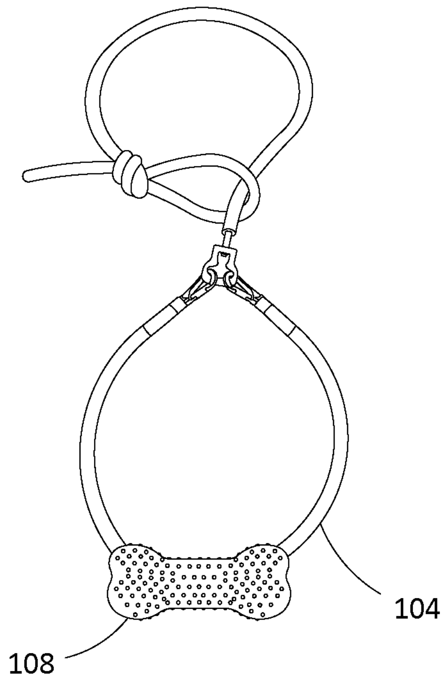
FIGS. 10*a* and 10*b* illustrate a hands-free tug-of-war assembly and a hands-free leash formed by joining certain elements of the kit, according to some embodiments of the present invention.

In the example of FIG. 18, the stretchable element 200 may be located between a handle 102 and a double-clasped rope 104 joined to the chew toy 108, forming a one-handed tug-of-war assembly (as seen in FIG. 10*a*). The presence of the stretchable element 200 provides some elasticity to the one-handed tug-of-war assembly.

It should be noted that stretchable element 200 may be placed in any assembly formed by the kit, and that the examples of FIGS. 17 and 18 are not-limiting.

FIGS. 9*a*-14*c* illustrate non-limiting examples of leashes are tug-of-war assemblies that can be constructed using one, some, or all of the elements in the kit 100 of FIG. 1. After use, these leashes and assemblies are easily deconstructed, so the elements of the kit can be reused to assemble other types of leashes and assemblies.

FIGS. 9*a*-9*e* illustrate different types of leashes formed by joining certain elements of the kit, according to some embodiments of the present invention.

Figure 9A:
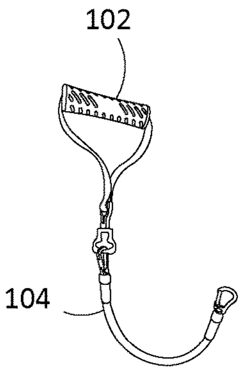
FIGS. 9*a*-9*e* illustrate different types of leashes formed by joining certain elements of the kit, according to some embodiments of the present invention.

In FIG. 9*a*, a short leash is formed by joining a short double-clasped rope 104 to the handle 102 via a clasp. The clasp of the double-clasped rope that is not joined to the handle can be joined to the pet's collar or harness. The user holds the handle 102 to control the pet.

Figure 9B:
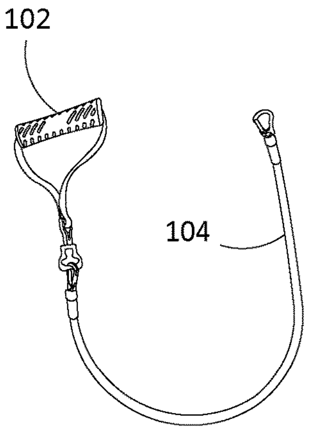

In FIG. 9*b*, a middle-length leash is formed by joining a middle-length double-clasped rope 104 to the handle 102 via a clasp. The clasp of the double-clasped rope that is not joined to the handle can be joined to the pet's collar or harness. The user holds the handle 102 to control the pet.

Figure 9C:
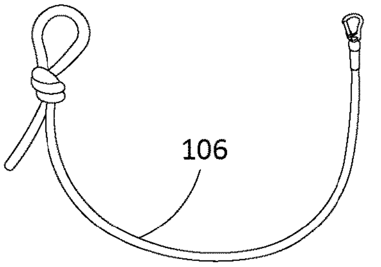

In FIG. 9*c*, the single-clasped rope alone forms the leash. The user holds the leash by hoping the loop of the knotted rope, while the clasp of the single-clasped rope can be joined to the pet's collar or harness.

Figure 9D:
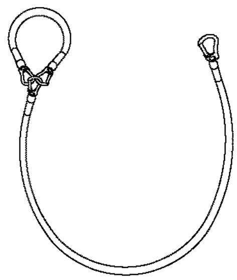

In FIG. 9*d*, a middle-length leash is formed by joining a two ends of a short double-clasped rope to one of the clasps of a middle-length double-clasped rope. The clasp of the middle-length double-clasped rope that is not joined to the short double-clasped rope can be joined to the pet's collar or harness. The user holds short double-clasped rope as a handle to control the pet.

Figure 9E:
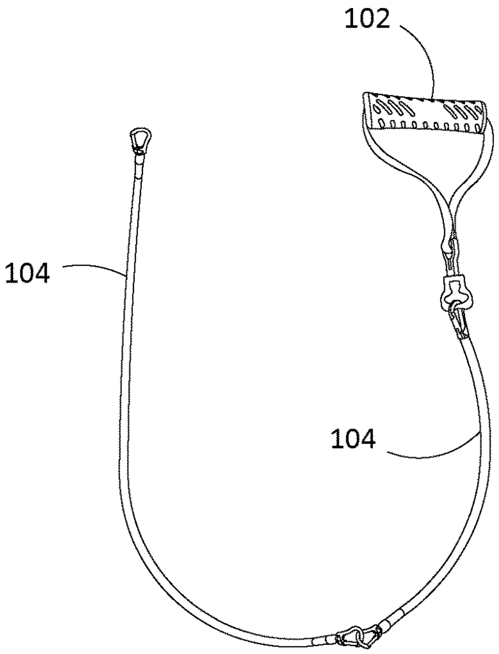

In FIG. 9*e*, a long leash is formed by joining a first the double clasped ropes 104 to the handle 102 via a clasp. The clasp of the first double-clasped rope that is not joined to the handle is joined to a second double-clasped rope 104. The clasp of the second double-clasped rope that is not joined to the first double-clasped rope 104 can be joined to the pet's collar or harness. The user holds the handle 102 to control the pet.

Figure 10B:
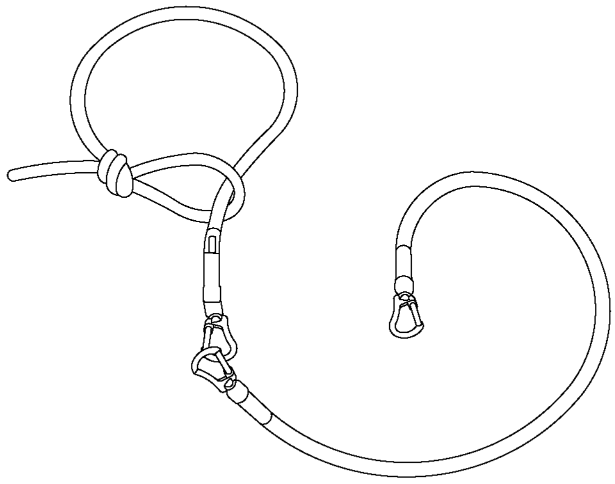

FIGS. 10*a* and 10*b* illustrate a hands-free tug-of-war assembly and a hands-free leash formed by joining certain elements of the kit, according to some embodiments of the present invention.

In FIG. 10*a*, a hands-free tug-of-war assembly is formed as follows: a double-clasped rope 104 is inserted to traverse the chew toy 108. The clasped end of the single-clasped rope 106 is inserted to traverse the loop of the single-clasped rope 106, so the single-clasped rope loops around a user's torso. The two clasps of the double-clasped rope 104 are joined to the clasp of a single-clasped rope 106. In this manner, a tug-of-war assembly is formed to encircle and be held by the user's torso or waist, while the chew toy 108 is held at a certain distance from the user's body, allowing the user to move the user's torso to move the chew toy around and to pull the chew toy while the chew toy is bitten by the pet.

In FIG. 10*b*, a hands-free leash is formed as follows: the clasped end of the single-clasped rope 106 is inserted to traverse the loop of the single-clasped rope 106, so the single-clasped rope loops around a user's torso or waist. A clasp of the double-clasped rope 104 is joined to the clasp of a single-clasped rope 106, while the other clasp of the double-clasped rope 104 can be joined to the pet's collar or harness. In this manner, a leash is formed to encircle and be held by the user's torso. The pet's movement is restricted to a certain radius around the user's torso.

The hands-free tug-of-war assembly and leash can be used by users with injured arms or hands, and by users missing upper limbs.

Figure 11A:
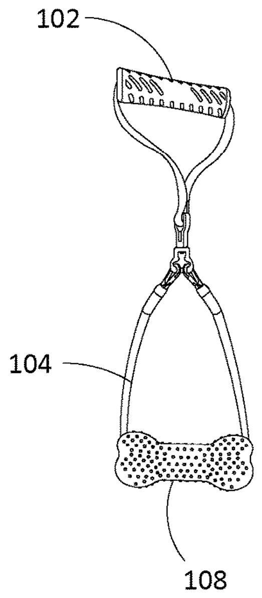
FIGS. 11*a*-11*c* illustrate different types of one-handed tug-of-war assemblies formed by joining certain elements of the kit, according to some embodiments of the present invention.
Figure 11B:
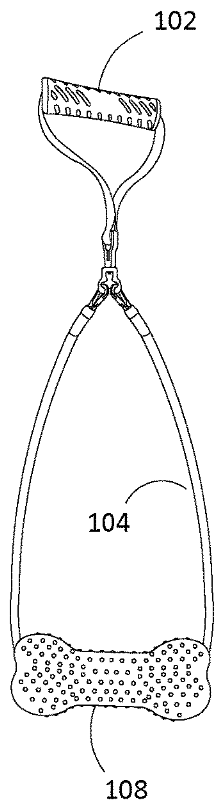
Figure 11C:
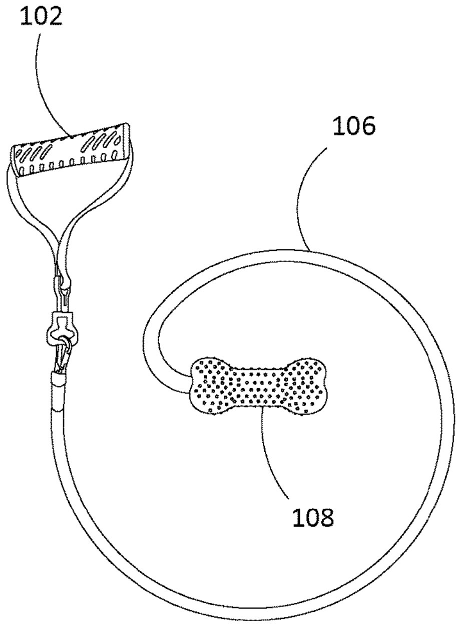

FIGS. 11*a*-11*c* illustrate different types of one-handed tug-of-war assemblies formed by joining certain elements of the kit, according to some embodiments of the present invention. Each one-handed tug-of-war assembly has a respective length. The length provided by each one-handed tug-of-war assembly provides a different tug-of-war experience for the user and their pet.

In the example of FIG. 11*a*, a short one-handed tug of war assembly is constructed as follows: a short double-clasped rope 104 is inserted to traverse the chew toy 108, and the two clasps of the double-clasped rope 104 are joined to the handle 102. The user holds the handle 102 to move and pull the chew toy 104. The chew toy is at a certain distance from the clasp and swivel end, thus lowering the chances of the pet accidentally bite the clasp and swivel end while the pet tries to bite the chew toy.

In the example of FIG. 11*b*, a medium-sized one-handed tug of war assembly is constructed as follows: a medium-sized double-clasped rope 104 is inserted to traverse the chew toy 108, and the two clasps of the double-clasped rope 104 are joined to the handle 102. The user holds the handle 102 to move and pull the chew toy 104. The chew toy is at a certain distance from the clasp and swivel end, thus lowering the chances of the pet accidentally bite the clasp and swivel end while the pet tries to bite the chew toy.

In the example of FIG. 11*c*, a tug of war assembly is constructed as follows: a single-clasped rope 104 is inserted to traverse the chew toy 108, and the single clasp of the single-clasped rope 104 is joined to the handle 102. The knot of the single-clasped rope keeps the chew toy 108 from falling off the single-clasped rope 106. The user holds the handle 102 to move and pull the chew toy 104. The chew toy is at a certain distance from the clasp and swivel end, thus lowering the chances of the pet accidentally bite the clasp and swivel end while the pet tries to bite the chew toy. The knot can be adjusted to increase or shorten the length of the tug-toy assembly to provide a different tugging experience for the user and their dog. A loop may be present at the end of the single-clasped rope (after the knot), and can be used as an additional handle to provide a two-handed tugging experience similar to that of FIGS. 12*d* & 12*e*.

FIGS. 12*a*-12*e* illustrate different types of two-handed tug-of-war assemblies formed by joining certain elements of the kit, according to some embodiments of the present invention.

Figure 12A:
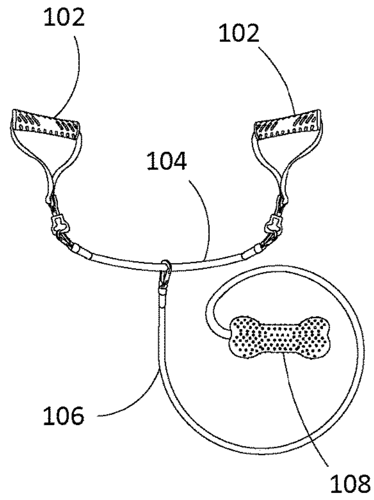
FIGS. 12*a*-12*e* illustrate different types of two-handed tug-of-war assemblies formed by joining certain elements of the kit, according to some embodiments of the present invention.

In the example of FIG. 12*a*, two handles 102 are joined to a short double-clasped rope 104, a single-clasped rope 104 is inserted to traverse the chew toy 108, and the single clasp of the single-clasped rope 104 is joined to the short double-clasped rope 104, and can travel along the short double-clasped rope 104. The knot of the single-clasped rope keeps the chew toy 108 from falling off the single-clasped rope 106. The user holds the two handles with two hands, to play tug-of-war.

Figure 12B:
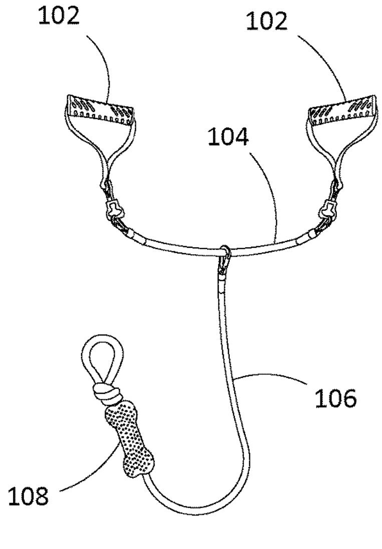

In the example of FIG. 12*b*, two handles 102 are joined to a medium-sized double-clasped rope 104, a single-clasped rope 106 is inserted to traverse the chew toy 108, and the single clasp of the single-clasped rope 106 is joined to the medium-sized double-clasped rope 104, and can travel along the medium-sized double-clasped rope 104. The knot of the single-clasped rope keeps the chew toy 108 from falling off the single-clasped rope 106. The user holds the two handles with two hands, to play tug-of-war.

Figure 12C:
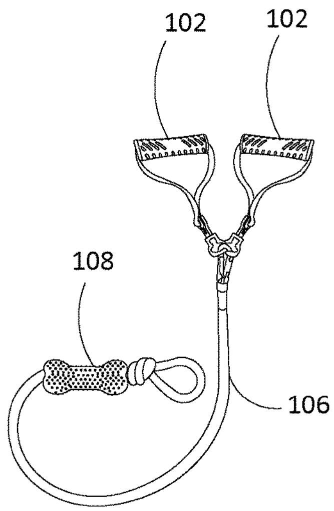

In the example of FIG. 12*c*, a single-clasped rope 106 is inserted to traverse the chew toy 108, and the single clasp of the single-clasped rope 104 is joined to two handles 102. The knot of the single-clasped rope keeps the chew toy 108 from falling off the single-clasped rope 106. The user holds the two handles with two hands, to play tug-of-war.

Figure 12D:
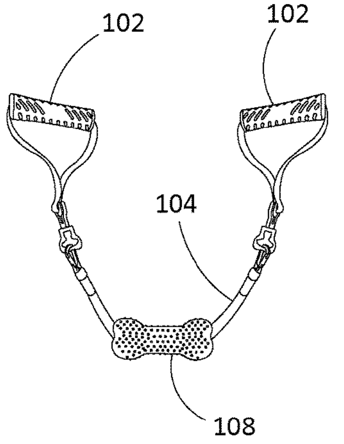

In the example of FIG. 12*d*, the chew toy is inserted to traverse a short double-clasped rope 104, while two handles 102 are joined to the short double-clasped rope 104. The user holds the two handles with two hands, to play tug-of-war.

Figure 12E:
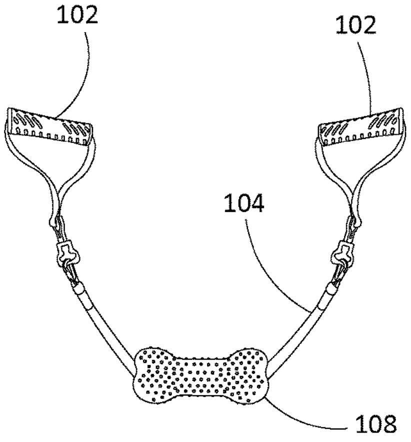

In the example of FIG. 12*e*, the chew toy is inserted to traverse a middle-sized double-clasped rope 104, while two handles 102 are joined to the middle-sized double-clasped rope 104. The user holds the two handles with two hands, to play tug-of-war.

The assemblies of FIGS. 12*a*-12*e* are advantageous when playing with larger and powerful pets (e.g., German shepherds, bulldogs, mastiffs, etc.), allowing the user to pull the chew toy from a distance with both hands. Such two-handed assemblies also enable the user to switch resistance between arms seamlessly without having to change hands like they would if they were using a single handed tug-toy assembly.

Figure 13A:
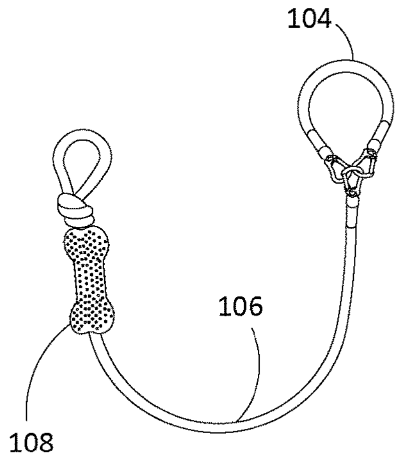
FIGS. 13*a*-13*b* illustrate different types of leg tug-of-war assemblies formed by joining certain elements of the kit, according to some embodiments of the present invention.
Figure 13B:
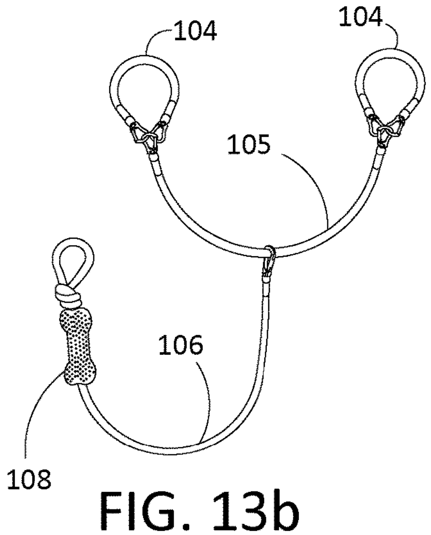

FIGS. 13*a*-13*b* illustrate different types of leg tug-of-war assemblies formed by joining certain elements of the kit, according to some embodiments of the present invention.

In FIG. 13*a*, a single-leg tug-of-war assembly is shown. A single-clasped rope 106 is traversed the chew toy 108. The clasp of the single-clasped rope is joined to the two clasps of a double-clasped rope 104. The double-clasped rope 104 may be a short double-clasped rope 104 and is configured for surrounding a user's leg.

In FIG. 13*b*, a two-leg tug-of-war assembly is shown. A single-clasped rope 106 is traversed the chew toy 108. The clasp of the single-clasped rope is joined to a first double-clasped rope 105 (similar to any previously-described double-clasped rope 104) and is configured to move along the double-clasped rope 104. Each of the clasps of the first double-clasped rope 104 is configured to be joined to two clasps of a second double-clasped rope 104. The two double-clasped ropes 104 may be short double-clasped ropes 104 and are configured for surrounding the user's respective legs.

In some embodiments of the present invention, the first double-clasped rope(s) 104 may be replaced by bungee handle(s) 200 (shown in FIG. 17). The clasp 204 and the ring 206 of the bungee handle are connected to the clasp of the second double-clasped rope 104 or the clasp of the single-clasped rope 106 to create loops for users feet and/or legs.

Figure 14A:
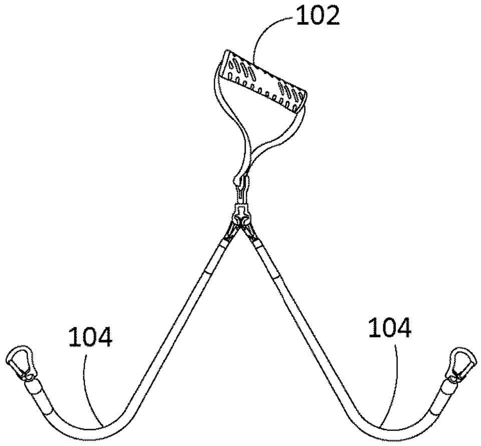
FIGS. 14*a*-14*c* illustrate different types of two-dog leashes and tug-of-war assemblies formed by joining certain elements of the kit, according to some embodiments of the present invention.
Figure 14B:
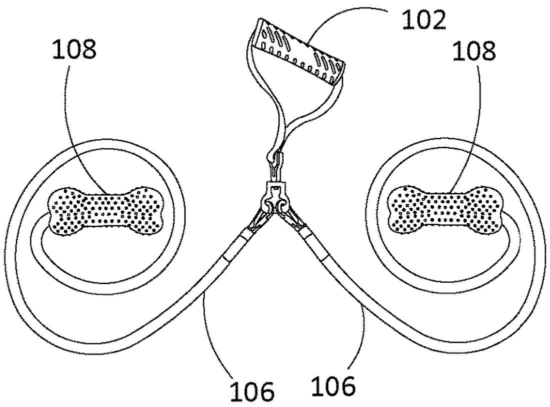
Figure 14C:
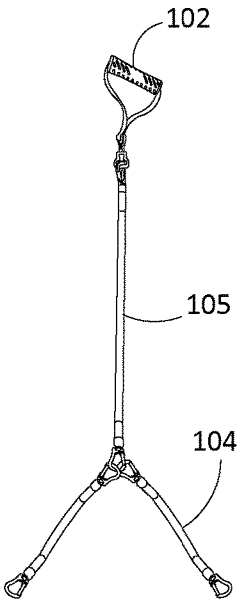

FIGS. 14*a*-14*c* illustrate different types of two-dog leashes and tug-of-war assemblies formed by joining certain elements of the kit, according to some embodiments of the present invention.

In the example of FIG. 14*a*, a two-dog leash is constructed using a handle 102 and two double-clasped ropes 104. The clasps of the double clasped ropes 104 are joined to the handle 102. Each of the clasps that are not joined to the handle can be joined to a pet's collar or harness. In this manner, a user may use a single leash to walk two dogs.

In the example of FIG. 14*b*, a two-dog tug-of-war assembly is constructed using a handle 102, two single-clasped ropes 106, and two chew toys 108. Each chew toy 108 is traversed by a respective single-clasped rope 106. The knots prevent the chew toys from slipping out of the single-clasped ropes. The clasps of the two single-clasped ropes are joined to the handle 102. In this manner, the user may play tug-of-war with two dogs, using to different chew toys held by via the same handle.

In the example of FIG. 14*c*, a two-dog leash is constructed using a handle 102 (or double clasped short rope as a handle by attaching each clasp to the proximal clasp of the medium rope) and two double-clasped ropes 104 and 105. One clasp of first double-clasped rope 105 (similar to any previously-described double-clasped rope 104) is joined to the handle 102. The second clasp of the first double-clasped rope 105 is joined to a second double-clasped rope 104, leaving the two clasps of the second double-clasped rope 104 free to be connected to collars and/or harnesses.

Figure 15A:
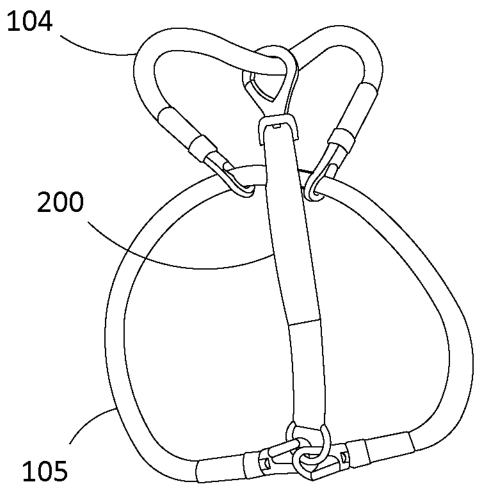
FIGS. 15*a* and 15*b* illustrate two double-clasped ropes and a bungee handle forming a harness, according to some embodiments of the present invention.
Figure 15B:
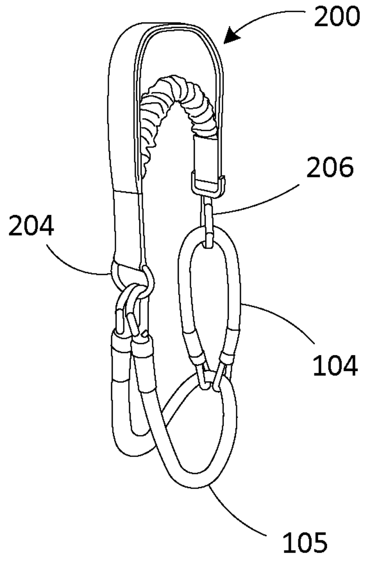

In the example of FIGS. 15*a* and 15*b*, a short double-clasped rope 104, a medium double-clasped rope 105, and a bungee handle 200 are used to form a harness, according to some embodiments of the present invention. FIG. 15*a* is a top view of the harness, while FIG. 15*b* is a rear view of the harness.

To form the harness of FIGS. 15*a* and 15*b*, both clasps of the short double-clasped rope 104 are attach to the rope section of the medium double clasped rope 105 to create a loop for the dogs head to fit through. Both ends of the medium double-clasped rope are meant to go under the pet's armpits, wrap around the pet's torso, and attach to the ring 204 of the bungee handle 200 on the dogs back. The clasp 206 of the bungee handle 200 attaches to the rope section of the short double clasped rope 104 on the back of the pet's neck to complete the harness.

Figure 16:
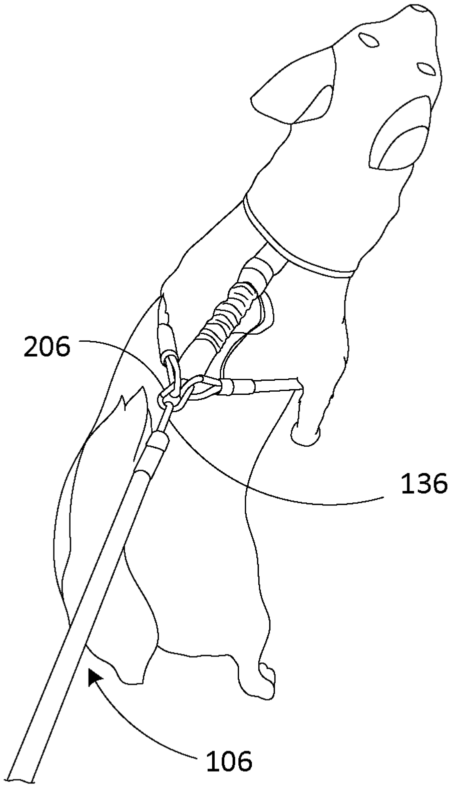
FIG. 16 illustrates a pet wearing the harness of FIGS. 15*a* and 15*b*, according to some embodiments of the present invention.

The ring 204 is configured for providing an attachment point for a leash having a clasp. For example, as seen in FIG. 16, the single-clasped rope 106 may be used as the leash. In such an embodiment, the clasp 136 of the single-clasped rope 106 (as seen in FIG. 4*a*) is attached to the ring 204 of the bungee handle 200 between the two clasps of the medium double clasped rope 105. The loop 138 of the single-clasped rope 106 (as seen in FIG. 4*a*) may be used as a handle for holding the single-clasped rope 106 attached to the harness, and thereby controlling the movement of the pet.

FIG. 19 illustrates a safety lanyard 300, according to some embodiments of the present invention.

The safety lanyard 300 may be part of the kit 100 of FIG. 1. The safety lanyard 300 includes a cord 302 having a clasp 304 at one end and a ring 306 at the other end. The cord 302 and the clasp 304 are small enough to traverse the ring 306, so that a wrist loop can be formed.

The clasp 304 of the safety lanyard 300 may be attached to the clip 120 of swivel 118 of the handle 102 (FIG. 2), while the wrist loop is worn around the user's wrist. Thus, if the handle 102 is dropped or released, the wrist loop will still remain attached to the user's wrists, helping the user maintain control of handle 102.

What is claimed is:

1. A pet accessory kit, the kit for assembling a plurality of assemblies for handling a pet, the kit comprising:

at least one handle having a hand grip, and a looping cord, and a swivel end having a clip joined to the looping cord and further having a connection loop, such that the clip is configured to swivel at 360 degrees with respect to the swivel connection loop;

at least one double-clasped rope having two first ends, each first end having a respective first end attachment and a respective first clasp, each first clasp being rotatably joined to the respective first end attachment, such that each first clasp of the double-clasped rope is configured to swivel at 360 degrees with respect to the first respective end attachment;

at least one single-clasped rope having two second ends, one of the second ends being a free end configured to be knotted and another of the two second ends having a second end attachment and a second clasp, such that the second clasp is configured to swivel at 360 degrees with respect to the second end attachment;

at least one a chew toy having a perforation sized to be traversed by the at least one double-clasped rope, the first end attachment, the first clasp, the at least one single-clasped rope, the second end attachment and the second clasp;

wherein the first clasps and the second clasp are configured for selectively being detachably joined directly to each other, directly to the swivel end, and directly to any one of the ropes, for selectively forming a plurality of assemblies for handling a pet, the assemblies comprising at least: a pet leash and a pet tug-of-war assembly wherein the at least one handle, the at least one double-clasped rope, the at least one single-clasped rope, and the at least one chew toy are provided either as separate from each other or are separably joined to each other such that the at least one handle, the at least one double-clasped rope, the at least one single-clasped rope, and the at least one chew toy are configured to be removably joined together for selectively assembling the plurality of assemblies for handling a pet.

2. The pet accessory kit of claim 1, wherein the at least one double-clasped rope comprises two or more double-clasped ropes, each having respective first ends having respective first end attachments and respective first clasps.

3. The pet accessory kit of claim 2, wherein at least two of the two or more double-clasped ropes have different lengths.

4. The pet accessory kit of claim 1, wherein the at least one double-clasped rope is a plastic rope.

5. The pet accessory kit of claim 1, wherein the hand grip comprises an ergonomic sheath partially sheathing the looping cord.

6. The pet accessory kit of claim 1, wherein the first end attachments and the second end attachment are covered by a cover.

7. The pet accessory kit of claim 1, wherein the free end of the single-clasped rope is configured to be knotted with knot sized to not traverse the perforation of the chew toy, and is configured to be tied so that a loop is formed near the knot.

8. The pet accessory kit of claim 1, further comprising a stretchable element, which comprises:

an elastic rope a ring or third clasp on one end of the elastic rope;

a fourth clasp on another end of the elastic rope; and a non-stretchable strap made of flexible material, the strap having both ends connected to the ends of the elastic rope;

wherein the elastic rope in an equilibrium length thereof is shorter than the strap.

9. The pet accessory of claim 1, further comprising a safety lanyard, comprising a cord having a third clasp at one end and a ring at the other end;

wherein the ring is large enough to be traversed by the third clasp and the cord.

10. The pet accessory of the claim 1, wherein the connection loop, the first clasps, and the second clasp are sized such that two or more of the clasps are configured to be directly joined to the connection loop simultaneously.

11. The pet accessory of claim 1, wherein the connection loop has an aperture which has a narrow section and a wide section, the narrow section being proximal to the clip and extending away from the clip along a first axis from a first end proximal to the clip to a second end distal from the clip, and the wide section extending from the distal end of narrow section and extending along as second axis substantially perpendicular to the first axis.

12. A method for assembling an assembly for handling a pet, the method comprising:

(i) providing a kit comprising following elements:

a handle having a hand grip, a looping cord, and a swivel end joined to the looping cord and having a connection loop, such that the looping cord is configured to swivel at 360 degrees with respect to the connection loop;

a double-clasped rope having two first ends, each first end having a respective first end attachment and a respective first clasp, each first clasp being rotatably joined to the respective first end attachment, such that each first clasp of the double-clasped rope is configured to swivel at 360 degrees with respect to the first respective end attachment;

a single-clasped rope having two second ends, one of the second ends being a free end configured to be knotted and another of the two second ends having a second end attachment and a second clasp, such that the second clasp is configured to swivel at 360 degrees with respect to the second end attachment;

a chew toy having a perforation sized to be traversed by the double-clasped rope, the first end attachment, the first clasp, the single-clasped rope, the second end attachment and the second clasp;

wherein the first clasps and the second clasp are configured for selectively being detachably joined directly to each other, directly to connection loop of the swivel end, and directly to any one of the ropes;

wherein the handle, the double-clasped rope, the single-clasped rope, and chew toy are provided either as separate from each other or are separably joined to each other;

(ii) selecting two or more of the elements of the kit, according to a desired assembly for handling a pet; and (iii) removably joining the selected elements to each other to removably assemble the desired assembly.

13. The method of claim 12, wherein the desired assembly is a tug of war assembly and wherein:

selecting the two or more elements comprises selecting the handle, the double-clasped rope, and the chew toy;

removably joining the selected elements comprises:

threading the double-clasped rope through the perforation of the chew toy, such that the chew toy is retained by the double-clasped rope between the two first clasps; and joining the first clasps of the double-clasped rope to the connection loop of the swivel end.

14. The method of claim 13, wherein:

the kit further comprises a safety lanyard comprising a cord having a third clasp at one end and a ring at the other end, wherein the ring is large enough to be traversed by the third clasp and the cord;

selecting the two or more elements further comprises selecting the safety lanyard;

removably joining the selected elements further comprises joining the safety lanyard to the handle.

15. The method of claim 12, wherein the desired assembly is a tug of war assembly and wherein:

selecting the two or more elements comprises selecting the handle, the single-clasped rope, and the chew toy;

removably joining the selected elements comprises:

knotting the free end of the single-clasped rope with knot sized to not traverse the perforation of the chew toy;

threading the single-clasped rope through the perforation of the chew toy, such that the chew toy is retained by the single-clasped rope between the knot and the second clasp; and joining the second clasp of the single-clasped rope to the connection loop of the swivel end.

16. The method of claim 15, wherein:

the kit further comprises a safety lanyard comprising a cord having a third clasp at one end and a ring at the other end, wherein the ring is large enough to be traversed by the third clasp and the cord;

selecting the two or more elements further comprises selecting the safety lanyard;

removably joining the selected elements further comprises joining the safety lanyard to the handle.

17. The method of claim 12, wherein the desired assembly is a tug of war assembly and wherein:

selecting the two or more elements comprises selecting the double-clasped-rope, the single-clasped rope, and the chew toy;

removably joining the selected elements comprises:

knotting the free end of the single-clasped rope with knot sized to not traverse the perforation of the chew toy;

threading the single-clasped rope through the perforation of the chew toy, such that the chew toy is retained by the single-clasped rope between the knot and the second clasp; and joining the first clasps of the double-clasped rope to second clasp of the single-clasped rope.

18. The method of claim 12, wherein the desired assembly is a leash assembly, and wherein:

selecting the two or more elements comprises selecting a first double-clasped-rope and a second double clasped rope;

removably joining the selected elements comprises joining both first clasps of the first double-clasped rope to one of the first clasps of the second single-clasped rope.

19. The method of claim 12, wherein:

the double-clasped-rope is a first double-clasped-rope;

the kit further comprises a second double-clasped rope having two respective first ends, each of the respective first end having a respective first end attachment and a respective first clasp, each first clasp being rotatably joined to the respective first end attachment, such that each first clasp of the double-clasped rope is configured to swivel at 360 degrees with respect to the first respective end attachment the kit further comprises a stretchable element, which comprises: an elastic rope; a ring or third clasp on one end of the elastic rope; a fourth clasp on another end of the elastic rope; and a non-stretchable strap made of flexible material, the strap having both ends connected to the ends of the elastic rope; wherein the elastic rope in an equilibrium length thereof is shorter than the strap;

the desired assembly is a harness;

selecting the two or more elements comprises selecting the first double-clasped-rope, the second single-clasped rope, and the stretchable element;

removably joining the selected elements comprises:

joining both of the first clasps of the first double-clasped rope to the ring or the third clasp of the stretchable element;

joining the first clasps of the second double clasped rope to the first double-clasped rope such that a rope section of the first double-clasped rope traverses the first clasps of the second double clasped rope;

joining the fourth clasp of the stretchable element to the second double clasped rope such that a rope section of the second double-clasped rope traverses the fourth clasp of the stretchable element.

20. The method of claim 12, wherein the desired assembly is a tug-of-war and wherein:

the kit further comprises a stretchable element, which comprises: an elastic rope; a ring or third clasp on one end of the elastic rope; a fourth clasp on another end of the elastic rope; and a non-stretchable strap made of flexible material, the strap having both ends connected to the ends of the elastic rope; wherein the elastic rope in an equilibrium length thereof is shorter than the strap;

selecting the two or more elements comprises selecting the handle, the stretchable element, the double-clasped rope, and the chew toy;

removably joining the selected elements to each other comprises:

removably joining the fourth clasp of the stretchable element to the connection loop of the swivel end of the handle;

threading the double-clasped rope through the perforation of the chew toy, such that the chew toy is retained by the double-clasped rope between the two first clasps;

removably joining the first clasps of the double-clasped rope to the ring or the third clasp of the stretchable element.

* * * * *